United States Patent
Saito et al.

(10) Patent No.: US 8,287,606 B2
(45) Date of Patent: Oct. 16, 2012

(54) METHOD OF MANUFACTURING A NON-AQUEOUS ELECTROLYTE SECONDARY BATTERY BY SUBJECTING SODIUM MAGNESIUM METAL OXIDE TO ION-EXCHANGE OF SODIUM FOR LITHIUM

(75) Inventors: Motoharu Saito, Kobe (JP); Sho Tsuruta, Kobe (JP); Masahisa Fujimoto, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 289 days.

(21) Appl. No.: 12/728,718

(22) Filed: Mar. 22, 2010

(65) Prior Publication Data
US 2010/0239912 A1    Sep. 23, 2010

(30) Foreign Application Priority Data
Mar. 23, 2009    (JP) .................. 2009-069497

(51) Int. Cl.
*H01M 4/1391*    (2010.01)
*H01M 4/48*    (2010.01)
*H01M 4/505*    (2010.01)
*H01M 10/04*    (2006.01)

(52) U.S. Cl. .............. 29/623.1; 29/623.3; 29/623.5

(58) Field of Classification Search .......... 429/224, 429/231.1, 231.6; 29/623.1–623.5
See application file for complete search history.

(56) References Cited

U.S. PATENT DOCUMENTS
6,306,542 B1    10/2001    Nakano et al.
6,511,647 B1 *  1/2003    Coowar ................... 423/599
6,960,335 B1 * 11/2005    Singhal et al. ............ 423/599
2002/0098146 A1  7/2002    Takada et al.

FOREIGN PATENT DOCUMENTS
| | | |
|---|---|---|
| EP | 1981102 A1 | 10/2008 |
| JP | 2000-203844 A | 7/2000 |
| JP | 2002-220231 A | 8/2002 |
| JP | 2007-220650 A | 8/2007 |
| JP | 2008071702 A * | 3/2008 |
| JP | 2009-032681 A | 2/2009 |
| WO | 2009/001557 A1 | 12/2008 |

OTHER PUBLICATIONS

IPDL Machine Translation of the Detailed Description of JP 2008-071702A, Mar. 2008.*
D. Carlier et al, "Lithium Electrochemical Deintercalation from O2-LiCoO2", Journal of the Electrochemical Society, 2002, vol. 149, pp. A1310-A1320.
J. M. Paulsen et al, "Layered T2, O6, O2, and P2 Type . . . Bronzes, A=Li. Na M=Ni, Mg=Mn, Ti", Chemical Material, 2000, vol. 12, No. 8, pp. 2257-2267.

* cited by examiner

*Primary Examiner* — Gregg Cantelmo
(74) *Attorney, Agent, or Firm* — Westerman, Hattori, Daniels & Adrian, LLP

(57) ABSTRACT

A method of manufacturing a non-aqueous electrolyte secondary battery by subjecting a sodium-magnesium-containing oxide represented by the general formula $Na_cMg_bMO_{2\pm a}$, where $0.65 \leq c \leq 0.75$, $0 < b \leq 0.3$, $0 \leq a \leq 03$, and M is at least one of manganese and cobalt, to ion-exchange of sodium for lithium by using a molten salt, an aqueous solution, or an organic solvent, to prepare a positive electrode active material.

8 Claims, 16 Drawing Sheets

METHOD OF MANUFACTURING A NON-AQUEOUS ELECTROLYTE SECONDARY BATTERY BY SUBJECTING SODIUM MAGNESIUM METAL OXIDE TO ION-EXCHANGE OF SODIUM FOR LITHIUM

BACKGROUND OF THE INVENTION

1. Field of the Invention

The present invention relates to a non-aqueous electrolyte secondary battery that achieves high capacity and to a method of manufacturing the battery.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, non-aqueous electrolyte secondary batteries, which perform charge and discharge by transferring lithium ions between the positive and negative electrodes, have been widely used as a driving power source for the mobile information terminal devices.

As the mobile information terminal devices tend towards having greater numbers of functions, such as moving picture playing functions and gaming functions, the power consumption of the devices tends to increase. It is therefore strongly desired that the non-aqueous electrolyte secondary batteries used for the power sources of such devices have further higher capacities and higher performance to achieve longer battery life and improved output power. In addition, applications of the non-aqueous electrolyte secondary batteries are expected to expand from just the above-described applications but to power tools, power assisted bicycles, and moreover hybrid electric vehicles (HEVs) and electric vehicles (EVs). In order to meet such expectations, it is strongly desired that the capacity and the performance of the battery be improved further.

In order to increase the capacity of the non-aqueous electrolyte secondary battery, it is necessary to increase the capacity of the positive electrode. In particular, layered compounds are viewed as promising materials for positive electrode active materials. To date, many lithium-containing layered compounds have been studied. Among the materials that have been developed are $LiCoO_2$, $LiNiO_2$, $LiNi_{1/3}Co_{1/3}Mn_{1/3}O_2$, and $Na_xCo_yMn_{1-y}O_2$ where $0.6 \leq x \leq 0.8$ and $0.4 \leq y \leq 0.6$ (see Japanese Published Unexamined Patent Application No. 2002-220231).

In addition, a technique for synthesizing a lithium compound from a sodium compound has been studied as a method for synthesizing a novel lithium compound (see Japanese Published Unexamined Patent Application No. 2007-220650). According to this method a layered compound, which is difficult to synthesize with lithium, can be easily obtained. In particular, $Na_{0.7}CoO_2$ and $NaCo_{1/2}Mn_{1/2}O_2$ can be used as positive electrode active materials for lithium-ion batteries by ion-exchanging sodium for lithium. Therefore, much research has been conducted on synthesis methods and ion-exchange methods by chemical techniques using $Na_{0.7}CoO_2$ and $NaCo_{1/2}Mn_{1/2}O_2$.

The positive electrode active materials using sodium-based oxides are promising materials that are expected to yield high capacity, and by adding lithium thereto, further high capacity can be obtained. However, the addition of lithium causes the average discharge potential to decrease. Moreover, it causes formation of an impurity similar to $Li_2MnO_3$, resulting in the problem of side reactions during charge and discharge.

BRIEF SUMMARY OF THE INVENTION

Accordingly, it is an object of the present invention to provide a non-aqueous electrolyte secondary battery and a manufacturing method of the battery that can inhibit side reactions during charge and discharge by suppressing formation of an impurity similar to $Li_2MnO_3$ and that can preventing the discharge potential from decreasing even when lithium is added.

The present inventors studied various materials that may suppress formation of $Li_2MnO_3$ impurity and prevent the discharge voltage from decreasing, and as a result found that the foregoing object can be accomplished by using magnesium as an additive metal.

Accordingly, the present invention provides a non-aqueous electrolyte secondary battery comprising: a positive electrode containing a positive electrode active material comprising a lithium-containing oxide active material; a negative electrode; and a non-aqueous electrolyte, wherein: the lithium-containing oxide active material is represented by the general formula $Li_aMg_bMO_{2\pm\alpha}$, where $0.65 \leq a \leq 1.05$, $0 < b \leq 0.3$, $0 \leq \alpha \leq 0.3$, and M is at least one of manganese and cobalt; and the lithium-containing oxide active material has a main peak at $2\theta = 17.95°$ to $18.15°$, as determined by an X-ray powder crystal diffraction measurement (Cu$k\alpha$).

According to the present invention, formation of a lithium-containing impurity that is caused when adding lithium is suppressed so that side reactions are inhibited during charge and discharge, and at the same time, the discharge potential is prevented from decreasing, because magnesium is added to the positive electrode active material.

DETAILED DESCRIPTION OF THE INVENTION

Figure 1:
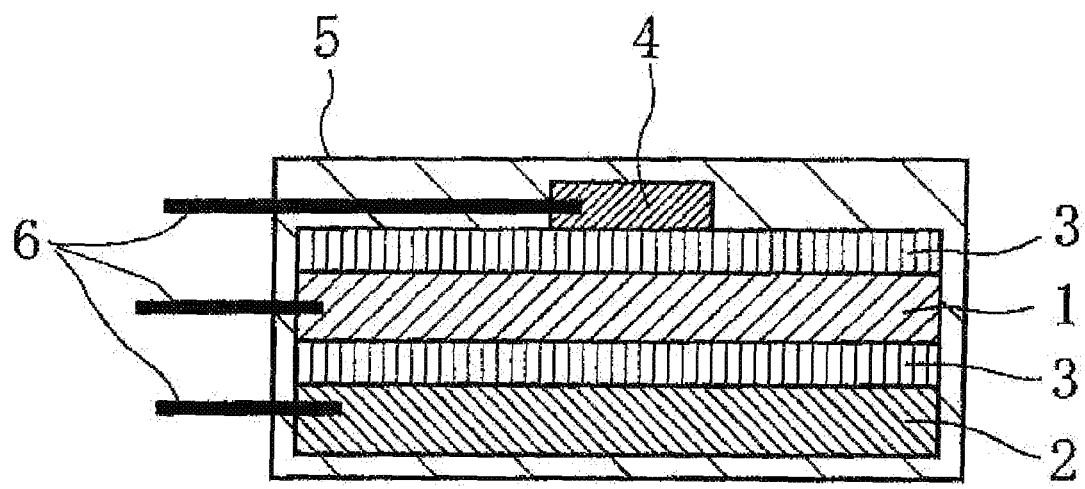
FIG. 1 is a cross-sectional view of a test cell used for the embodiments of the present invention.
Figure 2:
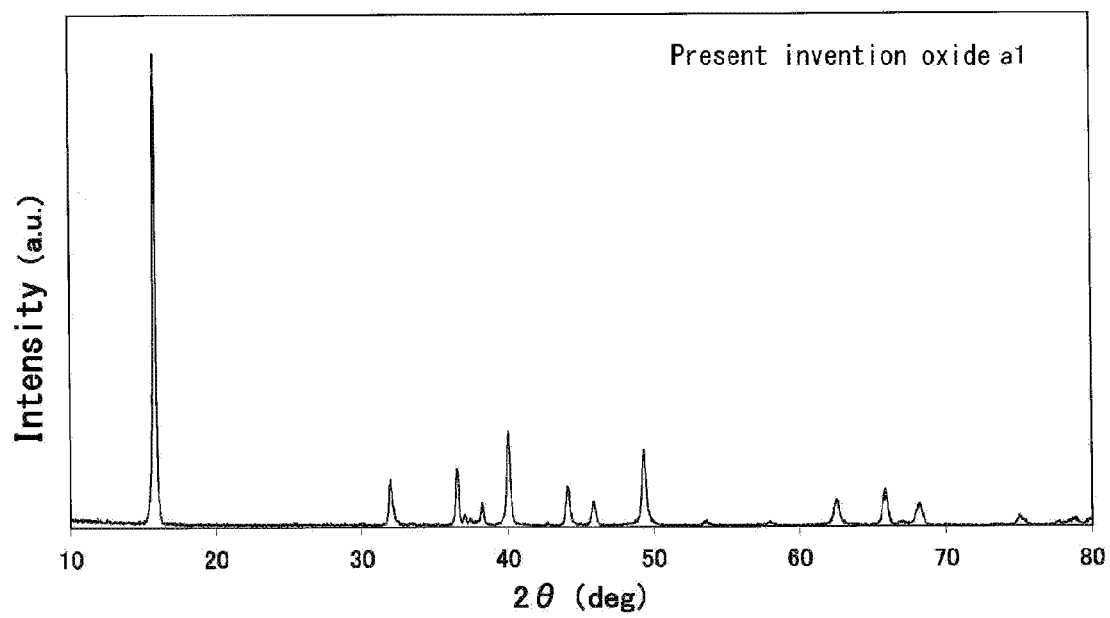
FIG. 2 is a graph showing the result of an XRD analysis for a present invention oxide a1.
Figure 3:
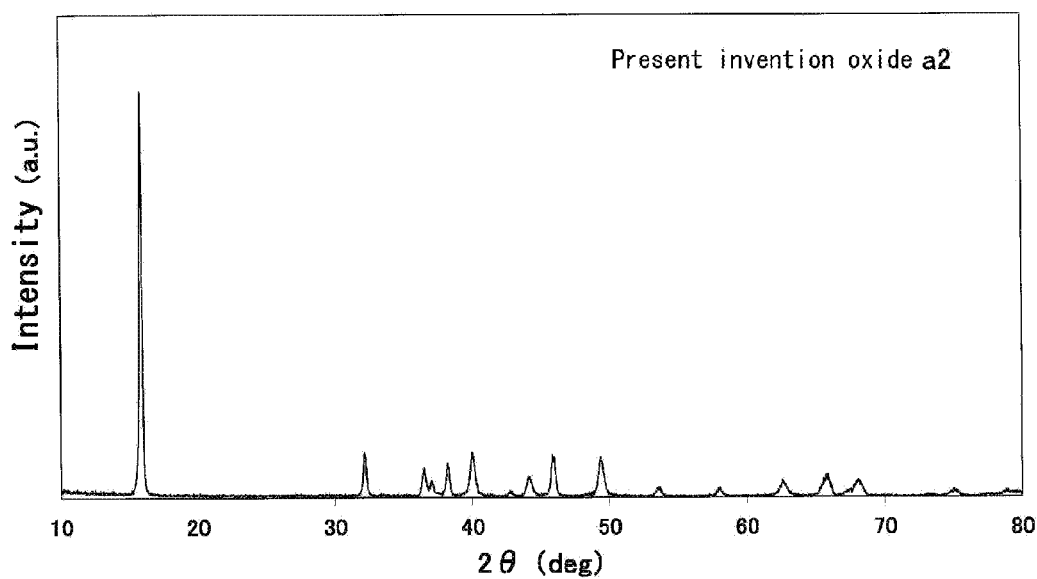
FIG. 3 is a graph showing the result of an XRD analysis for a present invention oxide a2.
Figure 4:
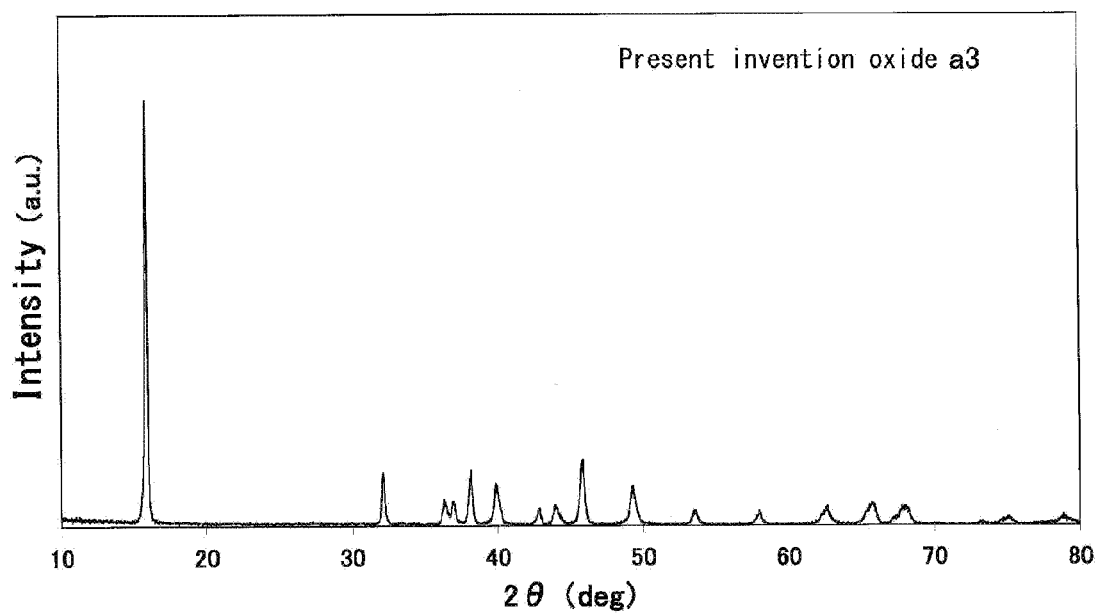
FIG. 4 is a graph showing the result of an XRD analysis for a present invention oxide a3.
Figure 5:
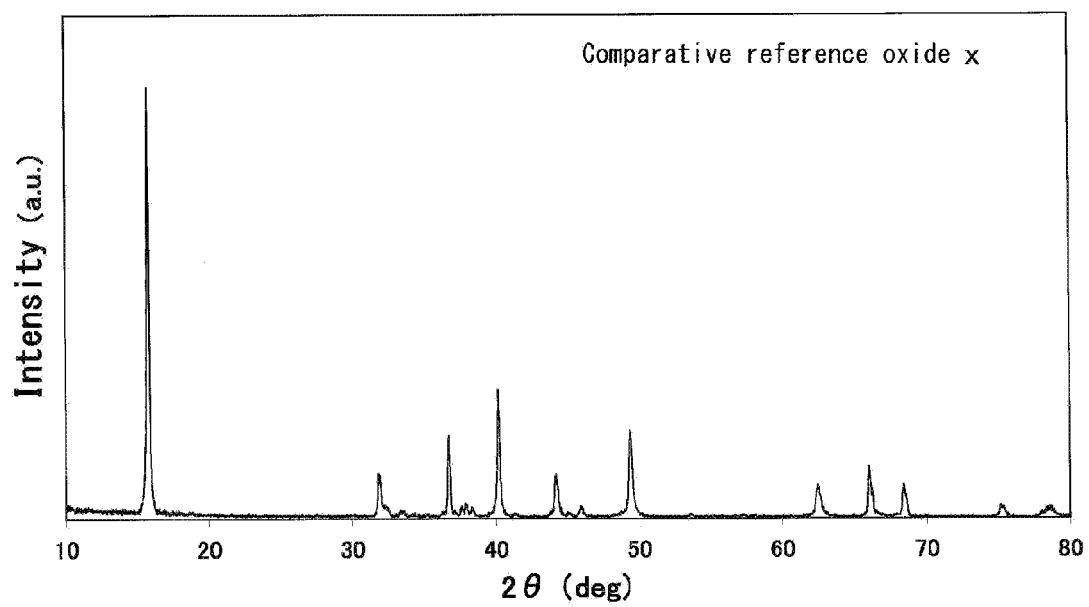
FIG. 5 is a graph showing the result of an XRD analysis for a comparative reference oxide x.
Figure 6:
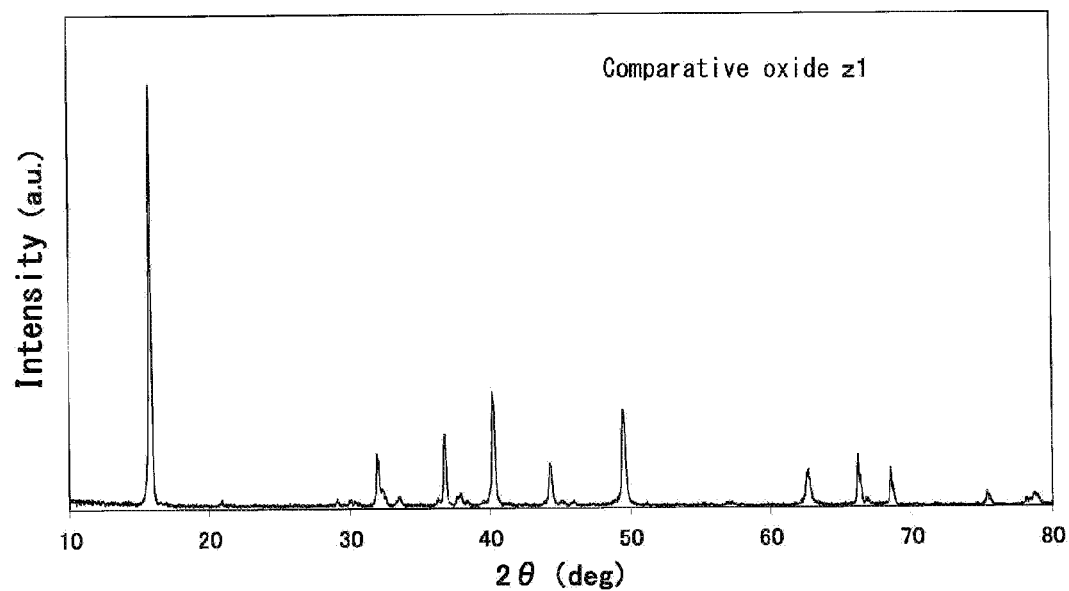
FIG. 6 is a graph showing the result of an XRD analysis for a comparative oxide z1.
Figure 7:
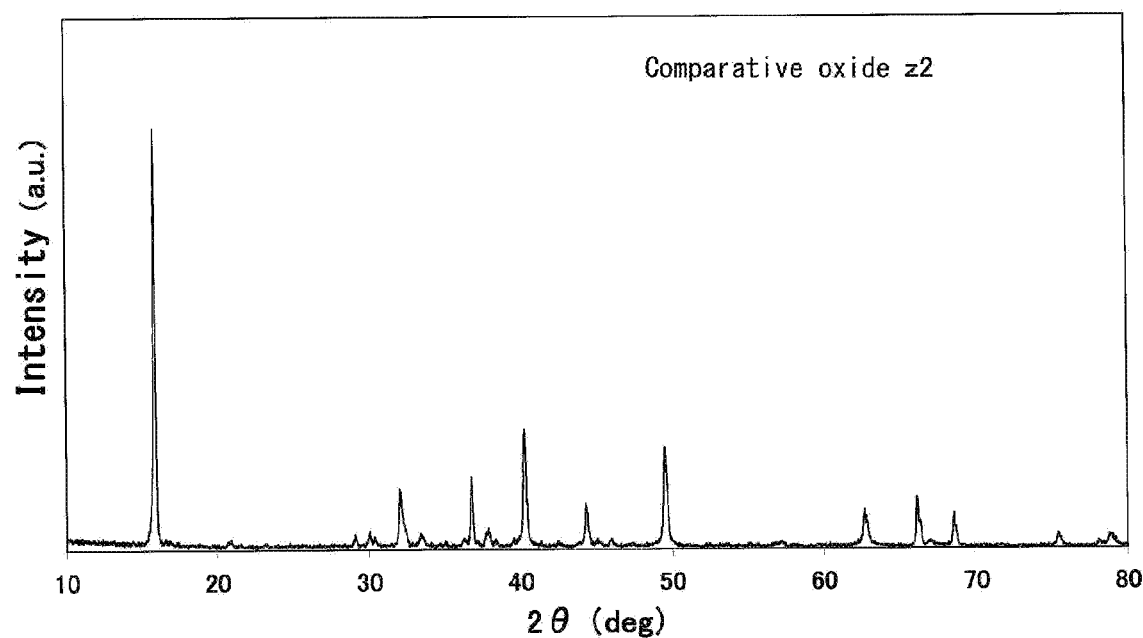
FIG. 7 is a graph showing the result of an XRD analysis for a comparative oxide z2.
Figure 8:
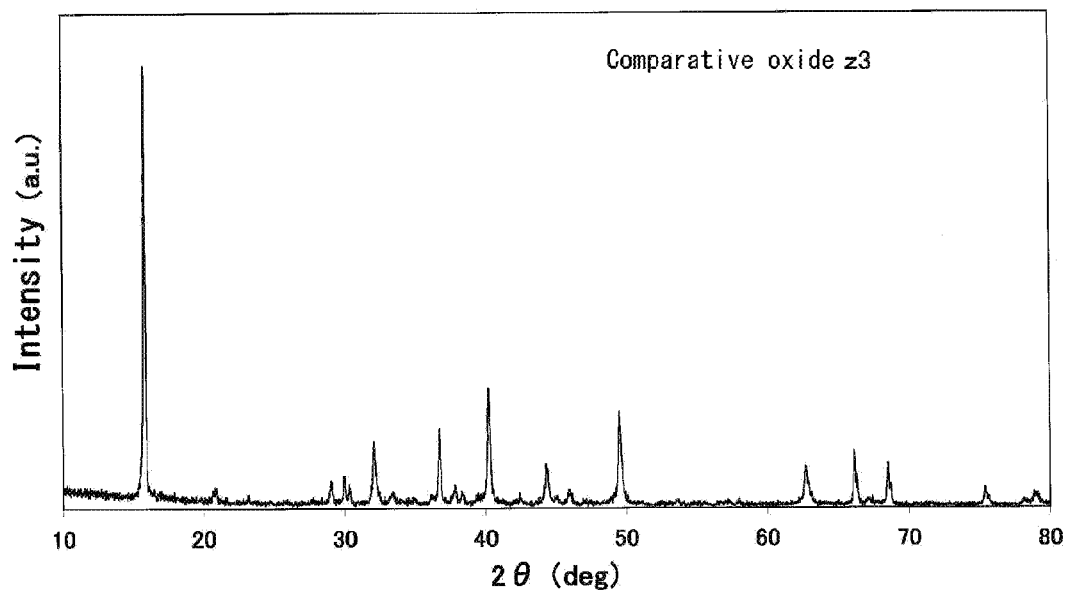
FIG. 8 is a graph showing the result of an XRD analysis for a comparative oxide z3.

The present invention provides a non-aqueous electrolyte secondary battery comprising: a positive electrode containing a positive electrode active material comprising a lithium-containing oxide active material; a negative electrode; and a non-aqueous electrolyte, wherein: the lithium-containing oxide active material is represented by the general formula $Li_aMg_bMO_{2\pm\alpha}$, where $0.65 \leq a \leq 1.05$, $0 < b \leq 0.3$, $0 \leq \alpha \leq 0.3$, and M is at least one of manganese and cobalt; and the lithium-containing oxide active material has a main peak at $2\theta = 17.95°$ to $18.15°$, as determined by an X-ray powder crystal diffraction measurement (CuKα).

When magnesium is added to the lithium-containing oxide, a lithium-containing impurity layer (a substance with a structure similar to $Li_2MnO_3$) that is formed when adding lithium is not formed. As a result, the side reactions that are caused by the lithium-containing impurity (decomposition of the impurity itself, decomposition of the electrolyte, and so forth) are inhibited.

Moreover, when magnesium is added, the average discharge potential increases. Therefore, it is possible to prevent the decrease of the average discharge potential caused by adding lithium. Therefore, in the battery that has the foregoing configuration, the energy density can be increased.

Note that although almost the whole amount of sodium is ion-exchanged by lithium, a small amount of sodium may remain, as will be described later. However, even if a small amount of sodium remains, the remaining amount will be very small and negligible.

It is desirable that the amount b of magnesium is preferably within the range $0 < b \leq 0.2$. The reason is as follows. Addition of a large amount of magnesium may cause substantial structural change or formation of impurity, resulting in more side reactions. Consequently, battery deterioration (such as gas formation, capacity loss, and storage performance deterioration) may occur.

It is desirable that the lithium-containing oxide active material be represented by the general formula $Li_aMg_bMn_xCo_yO_{2\pm\alpha}$, where $0.65 \leq a \leq 1.05$, $0 < b \leq 0.3$, $0.45 \leq x \leq 0.55$, $0.45 \leq y \leq 0.55$, $0.90 \leq x+y \leq 1.10$, and $0 \leq \alpha \leq 0.3$. It is also desirable that the lithium-containing oxide active material have a crystal structure belonging to an O2 structure, a T2 structure, an O6 structure, or a mixed structure thereof.

The present invention also provides a method of manufacturing a non-aqueous electrolyte secondary battery, comprising the steps of: subjecting a sodium-magnesium-containing oxide represented by the general formula $Na_cMg_bMO_{2\pm\alpha}$, where $0.65 \leq c \leq 0.75$, $0 < b \leq 0.3$, $0 \leq \alpha \leq 0.3$, and M is at lease one of manganese and cobalt, to ion-exchange of sodium for lithium by using a molten salt, an aqueous solution, or an organic solvent, to prepare a positive electrode active material; preparing a positive electrode active material slurry containing the positive electrode active material and a binder, and thereafter applying the positive electrode active material slurry to a positive electrode current collector to prepare a positive electrode; placing a separator between the positive electrode and the negative electrode to prepare a power-generating element; and encasing the power-generating element in a battery case and filling a non-aqueous electrolyte in the battery case.

When ion-exchanging the sodium-magnesium-containing oxide using an organic solvent or the like in the step of preparing the positive electrode active material, almost the whole amount of sodium is ion-exchanged for lithium. As a result, the positive electrode active material comprising the lithium-containing oxide is synthesized. The magnesium may or may not be ion-exchanged for lithium partially or entirely.

It is desirable that the sodium-magnesium-containing oxide be represented by the general formula $Na_cMg_bMn_xCo_yO_2$, where $0.65 \leq c \leq 0.75$, $0 < b \leq 0.3$, $0.45 \leq x \leq 0.55$, $0.45 \leq y \leq 0.55$, $0.90 \leq x+y \leq 1.10$, and $0 \leq \alpha \leq 0.3$.

Other Embodiments (1) As for the conductive agent used in preparing the electrode, the electrode can function even without adding any conductive agent in the case of using an active material having high electrical conductivity. However, when using an active material having low electrical conductivity, it is desirable to add a conductive agent. The conductive agent may be any material as long as it has electrical conductivity. It is desirable to use at least one substance selected from oxides, carbides, nitrides, and carbon materials that have particularly high conductivity. Examples of such oxides include tin oxide and indium oxide. Examples of such carbides include tungsten carbide and zirconium carbide. Examples of such nitrides include titanium nitride and tantalum nitride. In the case of adding a conductive agent, if the amount of the conductive agent added is too small, the conductivity in the positive electrode cannot be improved sufficiently. On the other hand, if the amount of the conductive agent added is too large, the relative proportion of the active material in the positive electrode will be low, and consequently a high energy density cannot be obtained. For this reason, it is desirable that the amount of the conductive agent be from 0 mass % to 30 mass %, more preferably from 0 mass % to 20 mass %, and still more preferably from 0 mass % to 10 mass %, with respect to the total amount of the positive electrode.

(2) Examples of the binder used for the electrode include polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, carboxymethylcellulose, and combinations thereof.

When the amount of the binder is too large, the relative proportion of the active material contained in the positive electrode will be small, so the battery will not have a high energy density. For this reason, it is desirable that the amount of the binder be from 0 mass % to 30 mass %, more preferably from 0 mass % to 20 mass %, and still more preferably from 0 mass % to 10 mass %, with respect to the total amount of the positive electrode.

(3) The material for the negative electrode may be any material that is capable of absorbing and deintercalating lithium. Examples include lithium, silicon, carbon, tin, germanium, aluminum, lead, indium, gallium, lithium-containing alloys, lithium-intercalated carbon materials, and lithium-intercalated silicon materials.

(4) Examples of the non-aqueous solvent used in the present invention include cyclic carbonic esters, chain carbonic esters, esters, cyclic ethers, chain ethers, nitriles, and amides.

Examples of the cyclic carbonic esters include ethylene carbonate, propylene carbonate, and butylenes carbonate. It is also possible to use a cyclic carbonic ester in which part or all of the hydrogen groups of the just-mentioned cyclic carbonic esters is/are fluorinated. Examples of such include trifluoropropylene carbonate and fluoroethyl carbonate. Examples of the chain carbonic esters include dimethyl carbonate, ethyl methyl carbonate, diethyl carbonate, methyl propyl carbonate, ethyl propyl carbonate, and methyl isopropyl carbonate. It is also possible to use a chain carbonic ester in which part or all of the hydrogen groups of one of the foregoing chain carbonic esters is/are fluorinated. Examples of the esters include methyl acetate, ethyl acetate, propyl acetate, methyl propionate, ethyl propionate, and γ-butyrolactone. Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butylphenyl ether, pentylphenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether. Examples of the nitriles include acetonitrile. Examples of the amides include dimethylformamide. These substances may be used either alone or in combination.

(5) The lithium salt to be added to the non-aqueous solvent may be any lithium salt that is commonly used in conventional non-aqueous electrolyte lithium-ion secondary batteries. For example, it is possible to use at least one substance selected from $LiBF_4$, $LiPF_6$, $LiCF_3SO_3$, $LiC_4F_9SO_3$, $LiN(CF_3SO_2)_2$, $LiN(C_2F_5SO_2)_2$, $LiAsF_6$, and lithium difluoro(oxalate)borate.

DESCRIPTION OF THE PREFERRED EMBODIMENTS

Hereinbelow, preferred embodiments of the non-aqueous electrolyte secondary battery according to the invention will be described with reference to FIG. 1. It should be construed, however, that the non-aqueous electrolyte secondary battery according to this invention is not limited to the following embodiments and examples but various changes and modifications are possible without departing from the scope of the invention.

Preparation of Working Electrode

First, sodium nitrate ($NaNO_3$), magnesium nitrate [$Mg(NO_3)_2$], magnesium carbonate ($MgCO_3$), manganese oxide ($Mn_2O_3$), and cobalt oxide ($Co_3O_4$) were used as the starting materials, and they were mixed so that the molar ratio of Na, Mg, Mn, and Co became 0.7:0.05:0.5:0.5. Next, the mixed powder was pre-sintered in the air at 700° C. for 10 hours, and then sintered in the air at 800° C. for 20 hours. This yielded a sodium-magnesium-containing oxide represented by the compositional formula $Na_{0.7}Mg_{0.05}Mn_{0.5}Co_{0.5}O_2$.

Next, a lithium oxide was prepared by ion-exchanging the sodium-magnesium-containing oxide as follows. A mixture of lithium nitrate and lithium chloride (88:12 mol %) was used as an ion-exchange bed. To 10 g of this mixture, 3 g of the sodium-magnesium-containing oxide to be ion-exchanged was added, and the mixture was kept at 280° C. for 10 hours to cause the reaction. Thereafter, the reaction product was washed with water to wash away nitrates, chlorides, and the unreacted products of the starting materials, and thereafter vacuum dried at 100° C. This yielded a positive electrode active material represented by the compositional formula $Li_{0.7}Mg_{0.05}Mn_{0.5}Co_{0.5}O_2$.

Next, 80 mass % of the positive electrode active material, 10 mass % of acetylene black as a conductive agent, and 10 mass % of polyvinylidene fluoride as a binder agent were mixed with N-methyl-2-pyrrolidone to obtain a positive electrode active material slurry. Lastly, the resultant positive electrode active material slurry was applied onto a positive electrode current collector surface, thereafter vacuum dried at 110° C., and shaped into a positive electrode.

Preparation of Counter Electrode and Reference Electrode

A metallic lithium plate was cut into a predetermined size, and a tab was attached thereto, to thereby prepare a counter electrode 2 (negative electrode) and a reference electrode 4.

Preparation of Non-Aqueous Electrolyte

A non-aqueous electrolyte solution was prepared by dissolving lithium hexafluorophosphate ($LiPF_6$) at a concentration of 1 mole/liter in a mixed solvent of 3:7 volume ratio of ethylene carbonate (EC) and diethyl carbonate (DEC) were mixed in a volume ratio of 3:7.

Preparation of Test Cell

Under an inert atmosphere, a counter electrode 2, a separator 3, a working electrode 1, a separator 3, and a reference electrode 4 were placed in a test cell container 5 made of a laminate film. Then, the above-described non-aqueous electrolyte was filled in the test cell container 5. Thus, a test cell as shown in FIG. 1 was prepared. Leads 6 were disposed in such a manner that a portion of each of the leads 6 protrudes from the test cell container 5.

EXAMPLES

Example 1

A sodium-magnesium-containing oxide, a positive electrode active material, and a test cell were fabricated in the same manner as described in the just-described embodiment.

The sodium-magnesium-containing oxide, the positive electrode active material, and the test cell prepared in the foregoing manner are hereinafter referred to as a present invention oxide a1, a present invention active material a1-i, and a present invention cell A1, respectively.

Example 2

A test cell was prepared in the same manner as described in Example 1 above except for the following. The mixture ratio of sodium nitrate, magnesium nitrate, magnesium carbonate, manganese oxide, and cobalt oxide as the starting materials was varied to prepare a sodium-magnesium-containing oxide represented by the compositional formula $Na_{0.7}Mg_{0.1}Mn_{0.5}Co_{0.5}O_2$. The resultant sodium-magnesium-containing oxide was ion-exchanged to synthesize a positive electrode active material represented by the compositional formula $Li_{0.7}Mg_{0.1}Mn_{0.5}Co_{0.5}O_2$.

The sodium-magnesium-containing oxide, the positive electrode active material, and the test cell prepared in the foregoing manner are hereinafter referred to as a present invention oxide a2, a present invention active material a2-i, and a present invention cell A2, respectively.

Example 3

A test cell was prepared in the same manner as described in Example 1 above except for the following. The mixture ratio of sodium nitrate, magnesium nitrate, magnesium carbonate, cobalt oxide, and manganese oxide as the starting materials was varied to prepare a sodium-magnesium-containing oxide represented by the compositional formula $Na_{0.7}Mg_{0.2}Mn_{0.5}Co_{0.5}O_2$. The resultant sodium-magnesium-containing oxide was ion-exchanged to synthesize a positive electrode active material represented by the compositional formula $Li_{0.7}Mg_{0.2}Mn_{0.5}Co_{0.5}O_2$.

The sodium-magnesium-containing oxide, the positive electrode active material, and the test cell prepared in the foregoing manner are hereinafter referred to as a present invention oxide a3, a present invention active material a3-i, and a present invention cell A3, respectively.

Comparative Reference Example

A test cell was prepared in the same manner as described in Example 1 above except for the following. Sodium nitrate ($NaNO_3$), manganese oxide ($Mn_2O_3$), and cobalt oxide ($Co_3O_4$) were used as the starting materials. The starting materials were mixed together so that the composition ratio of Na, Mn, and Co became 0.7:0.5:0.5 to prepare a sodium-containing oxide represented by the compositional formula $Na_{0.7}Mn_{0.5}Co_{0.5}O_2$. The resultant sodium-containing oxide was ion-exchanged to synthesize a positive electrode active material represented by the compositional formula $Li_{0.7}Mn_{0.5}Co_{0.5}O_2$.

The sodium-containing oxide, the positive electrode active material, and the test cell prepared in the foregoing manner are hereinafter referred to as a comparative reference oxide x, a comparative reference active material x-i, and a comparative reference cell X, respectively.

Comparative Example 1

A test cell was prepared in the same manner as described in Example 1 above except for the following. Sodium nitrate ($NaNO_3$), potassium acid carbonate ($KHCO_3$), manganese oxide ($Mn_2O_3$), and cobalt oxide ($Co_3O_4$) were used as the starting materials, and the starting materials were mixed together so that the composition ratio of Na, K, Mn, and Co became 0.7:0.1:0.5:0.5, to prepare a sodium-potassium-containing oxide represented by the compositional formula $Na_{0.7}K_{0.1}Mn_{0.5}Co_{0.5}O_2$. The resultant sodium-potassium-containing oxide was ion-exchanged to synthesize a positive electrode active material represented by the compositional formula $Li_{0.7}K_{0.1}Mn_{0.5}Co_{0.5}O_2$.

The sodium-potassium-containing oxide, the positive electrode active material, and the test cell prepared in the foregoing manner are hereinafter referred to as a comparative oxide z1, a comparative active material z1-i, and a comparative cell Z1, respectively.

Comparative Example 2

A test cell was prepared in the same manner as described in Comparative Example 1 above except for the following. The mixture ratio of sodium nitrate, potassium acid carbonate, manganese oxide, and cobalt oxide as the starting materials was varied to prepare a sodium-potassium-containing oxide represented by the compositional formula $Na_{0.7}K_{0.2}Mn_{0.5}Co_{0.5}O_2$. The resultant sodium-potassium-containing oxide was ion-exchanged to synthesize a positive electrode active material represented by the compositional formula $Li_{0.7}K_{0.2}Mn_{0.5}Co_{0.5}O_2$.

The sodium-potassium-containing oxide, the positive electrode active material, and the test cell prepared in the foregoing manner are hereinafter referred to as a comparative oxide z2, a comparative active material z2-i, and a comparative cell Z2, respectively.

Comparative Example 3

A test cell was prepared in the same manner as described in Comparative Example 1 above except for the following. The mixture ratio of sodium nitrate, potassium acid carbonate, manganese oxide, and cobalt oxide as the starting materials was varied to prepare a sodium-potassium-containing oxide represented by the compositional formula $Na_{0.7}K_{0.3}Mn_{0.5}Co_{0.5}O_2$. The resultant sodium-potassium-containing oxide was ion-exchanged to synthesize a positive electrode active material represented by the compositional formula $Li_{0.7}K_{0.3}Mn_{0.5}Co_{0.5}O_2$.

The sodium-potassium-containing oxide, the positive electrode active material, and the test cell prepared in the foregoing manner are hereinafter referred to as a comparative oxide z3, a comparative active material z3-i, and a comparative cell Z3, respectively.

Experiment 1

Figure 9:
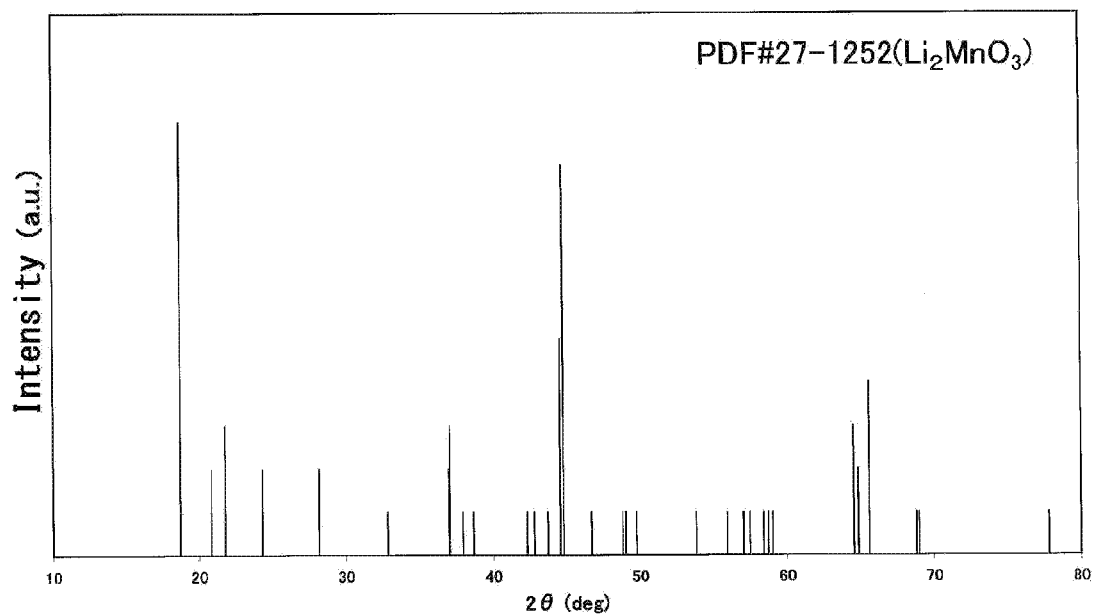
FIG. 9 is a graph showing the result of an XRD analysis for $Li_2MnO_3$.

An XRD measurement (radiation source: CuKα, measurement range: 2θ=10° to 80°) was conducted for the present invention oxides a1 to a3, the comparative reference oxide x, and the comparative oxides z1 to z3. The results are shown in FIGS. 2 to 8. For reference, the XRD profile of $Li_2MnO_3$ is shown in FIG. 9. The XRD profiles of the present invention oxides a1 to a3, the comparative reference oxide x, and the comparative oxides z1 to z3 were compared with the XRD profile of $Li_2MnO_3$. As a result, it was observed that all the oxides a1 to a3, x, and z1 to z3 showed no peak attributed to $Li_2MnO_3$, and they did not contain a substance having a similar structure to $Li_2MnO_3$, which is observed when lithium is added.

In addition, the present invention oxides a1 to a3 were compared with the comparative reference oxide x. As a result, it was observed that although most of their XRD profiles were similar to each other, but the present invention oxides a1 to a3, in which magnesium was added, showed additional peaks at 2θ=36.5°, 37.1°, and 38.2°. Accordingly, it is believed that the structures of the present invention oxides a1 to a3 are different from the comparative reference oxide x.

In addition, the comparative oxides z1 to z3 were also compared with the comparative reference oxide x. As a result, it was observed that their XRD profiles almost matched. Accordingly, it is believed that these oxides x and z1 to z3 have a P2 structure of the space group $P6_3/mmc$. Although the peaks that are not attributed to the P2 structure are observed in the XRD profiles of the comparative oxides z2 and z3, these peaks are attributed to impurities, which can be removed by washing with water.

Experiment 2

Lattice constants of the present invention oxides a1 to a3, the comparative reference oxide x, and the comparative oxides z1 to z3 were determined assuming the space group to be $P6_3/mmc$. The results are shown in Table 1 below.

TABLE 1

| Oxide | Additive Type | Additive Amount | a-axis (Å) | c-axis (Å) |
|---|---|---|---|---|
| Present invention oxide a1 | Mg | 0.05 | 2.8410 | 11.2075 |
| Present invention oxide a2 | | 0.1 | 2.8518 | 11.1566 |
| Present invention oxide a3 | | 0.2 | 2.8643 | 11.1481 |
| Comparative reference oxide x | — | — | 2.8301 | 11.2375 |
| Comparative oxide z1 | K | 0.1 | 2.8273 | 11.2160 |
| Comparative oxide z2 | | 0.2 | 2.8268 | 11.1905 |
| Comparative oxide z3 | | 0.3 | 2.8251 | 11.1566 |

As shown in Table 1, the relationship between the amount of magnesium added and the lattice constant was studied for the present invention oxides a1 to a3, in which magnesium was added. As a result, it was observed that when the amount of magnesium added was greater, the a-axis was longer and the c-axis was shorter accordingly. In comparison, the relationship between the amount of potassium added and the lattice constant was studied for the comparative oxides z1 to z3, in which potassium was added. As a result, it was observed that when the amount of potassium added was greater, both the a-axis and the c-axis were shorter.

From these results, it is understood that the addition of magnesium results in a structural change that is different from when potassium is added.

Experiment 3

An XRD measurement (radiation source: CuKα, measurement range: 2θ=10° to 80°) was conducted for the present invention active materials a1-i to a3-i, the comparative reference active material x-i, and the comparative active materials z1-i to z3-i (these active materials were obtained by subjecting the present invention oxides a1 to a3, the comparative reference oxide x, and the comparative oxides z1 to z3 to the ion-exchange). The results are shown in FIGS. 10 to 16.

As clearly seen from FIGS. 10 to 13, the XRD profiles are different between the comparative reference active material x-i, in which no magnesium or potassium is added, and the present invention active materials a1-i to a3-i, in which magnesium is added. This clearly demonstrates that the addition of magnesium causes a change in the structure.

Table 2 below shows the representative peak positions of the present invention active materials a1-i to a3-i, the comparative reference active material x-i, and the comparative active materials z1-i to z3-i.

TABLE 2

|  | Additive | | Main peak | Peak in the vicinity of 37.4° |
|---|---|---|---|---|
| Additive | Type | Amount | 2θ (deg.) | 2θ (deg.) |
| Present invention active material a1-i | Mg | 0.05 | 18.00 | 37.38 |
| Present invention active material a2-i |  | 0.1 | 18.06 | 37.30 |
| Present invention active material a3-i |  | 0.2 | 18.12 | 37.26 |
| Comparative reference active material x-i | — | — | 17.96 | 37.40 |
| Comparative oxide z1 | K | 0.1 | 17.96 | 37.38 |
| Comparative oxide z2 |  | 0.2 | 17.98 | 37.38 |
| Comparative oxide z3 |  | 0.3 | 18.00 | 37.38 |

Generally, it is known that in an XRD measurement, a shift of a peak position corresponds to a change of a lattice constant. When studying Table 2, it is observed that, in the present invention active materials a1-i to a3-i, the main peak shifts toward a greater angle as the amount of magnesium added increases. This is believed to correspond to the fact that the crystal lattice becomes smaller because of the addition of magnesium.

Figure 10:
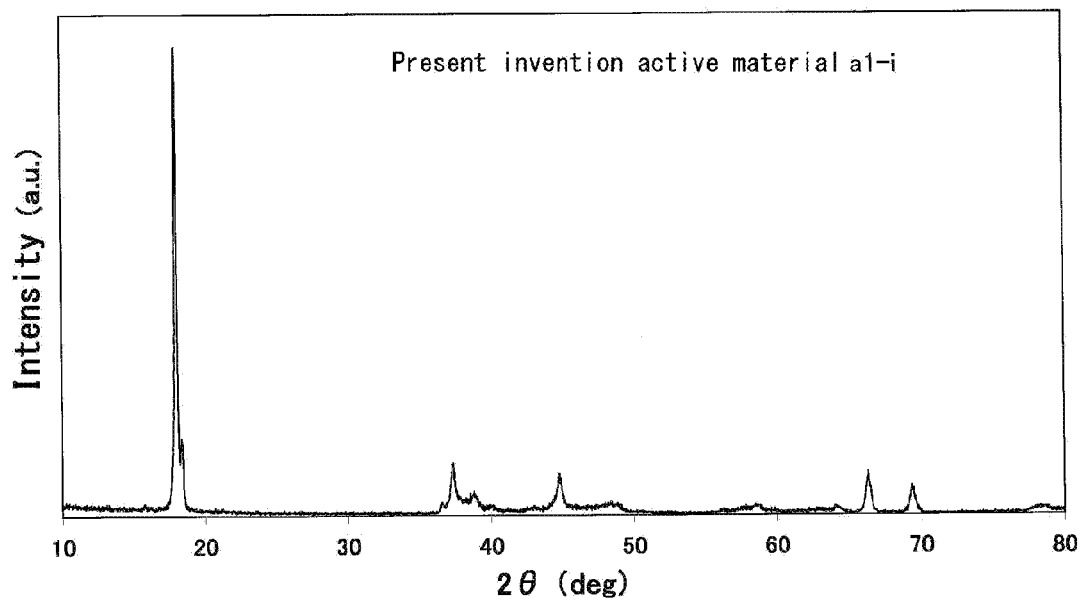
FIG. 10 is a graph showing the result of an XRD analysis for a present invention active material a1-i.
Figure 11:
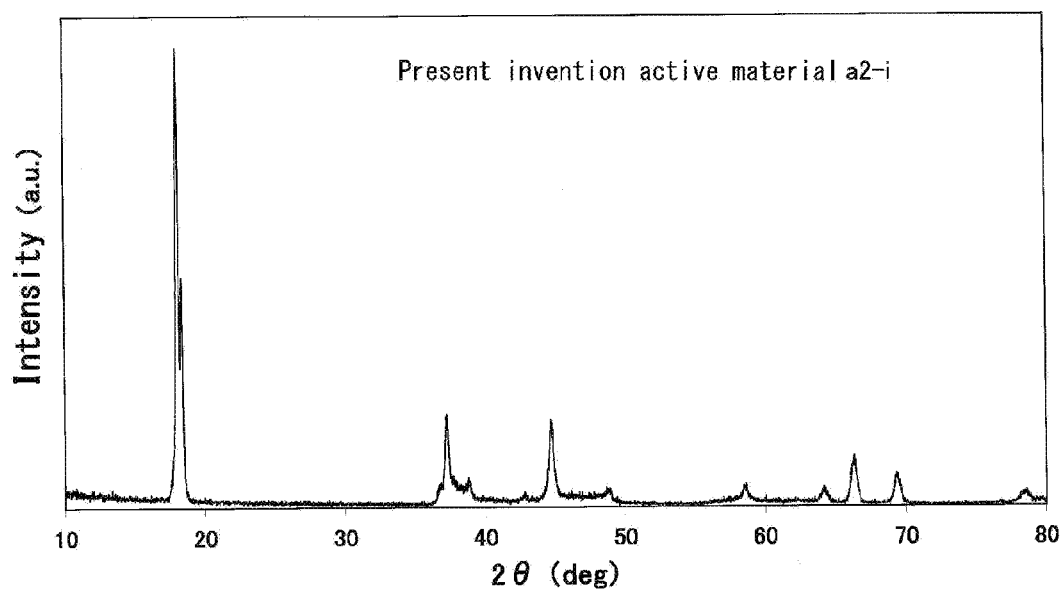
FIG. 11 is a graph showing the result of an XRD analysis for a present invention active material a2-i.
Figure 12:
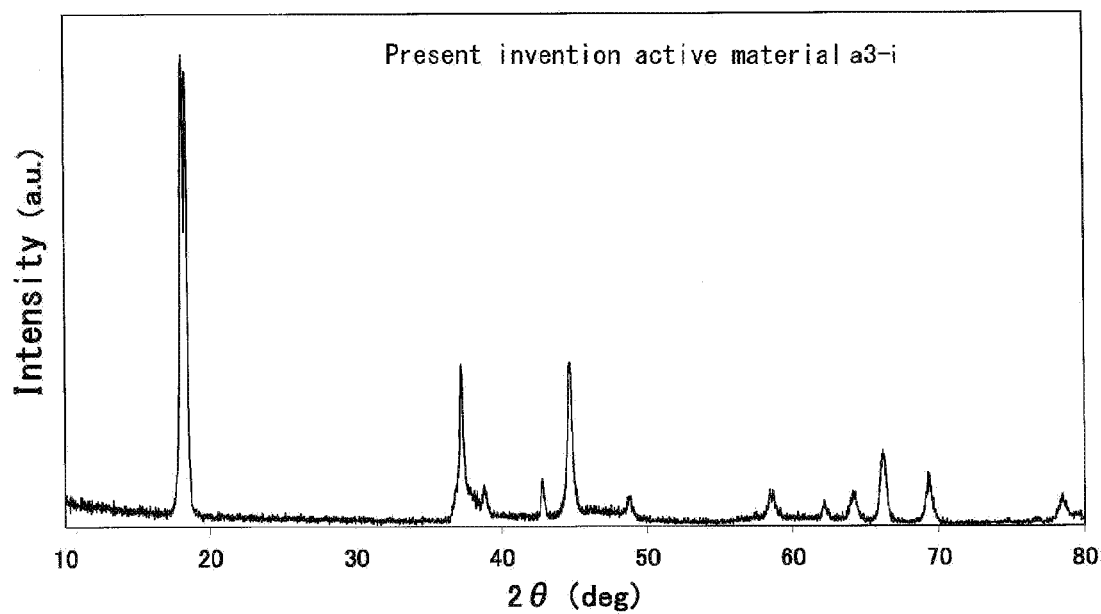
FIG. 12 is a graph showing the result of an XRD analysis for a present invention active material a3-i.
Figure 13:
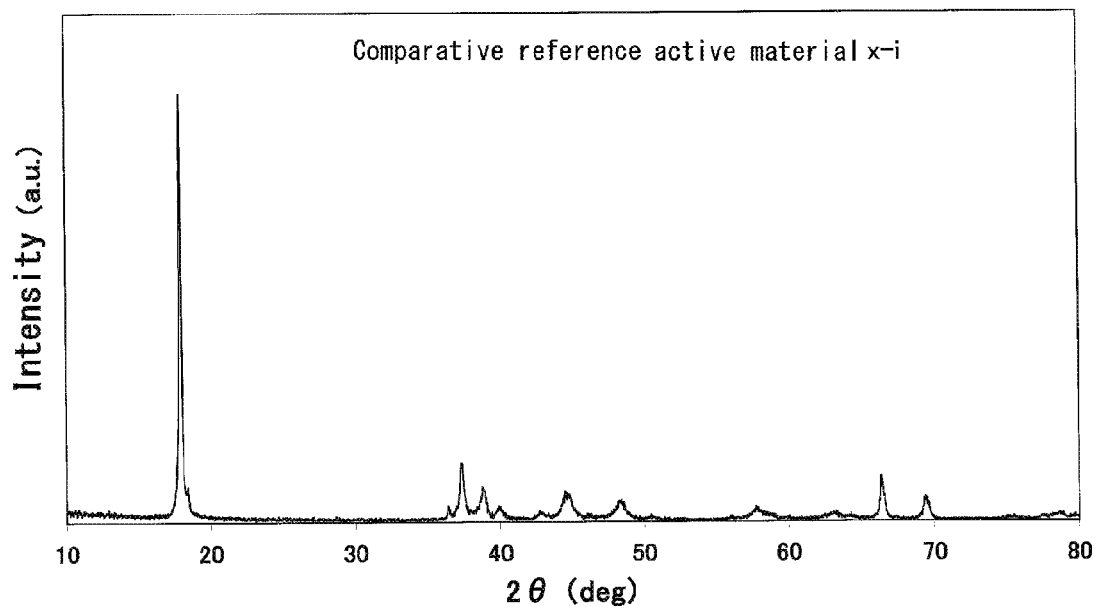
FIG. 13 is a graph showing the result of an XRD analysis for a comparative reference active material x-i.
Figure 14:
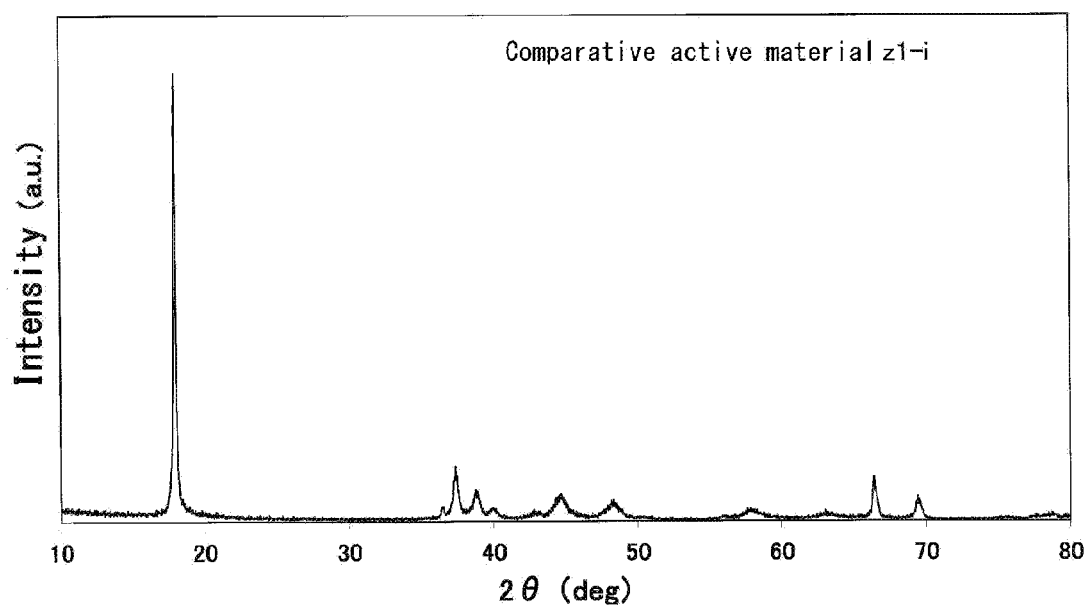
FIG. 14 is a graph showing the result of an XRD analysis for a comparative active material z1-i.
Figure 15:
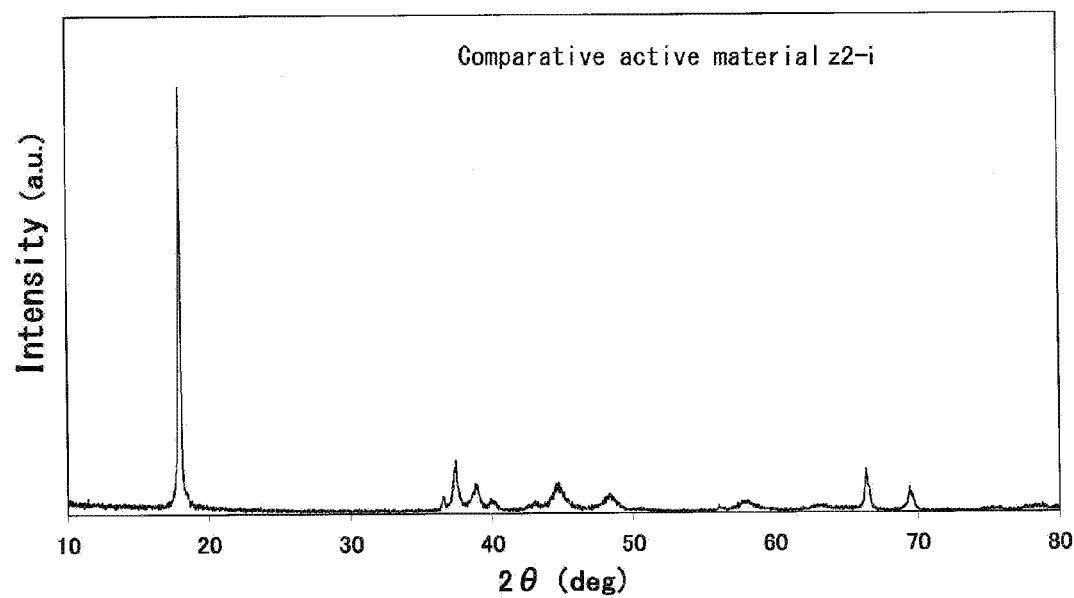
FIG. 15 is a graph showing the result of an XRD analysis for a comparative active material z2-i.
Figure 16:
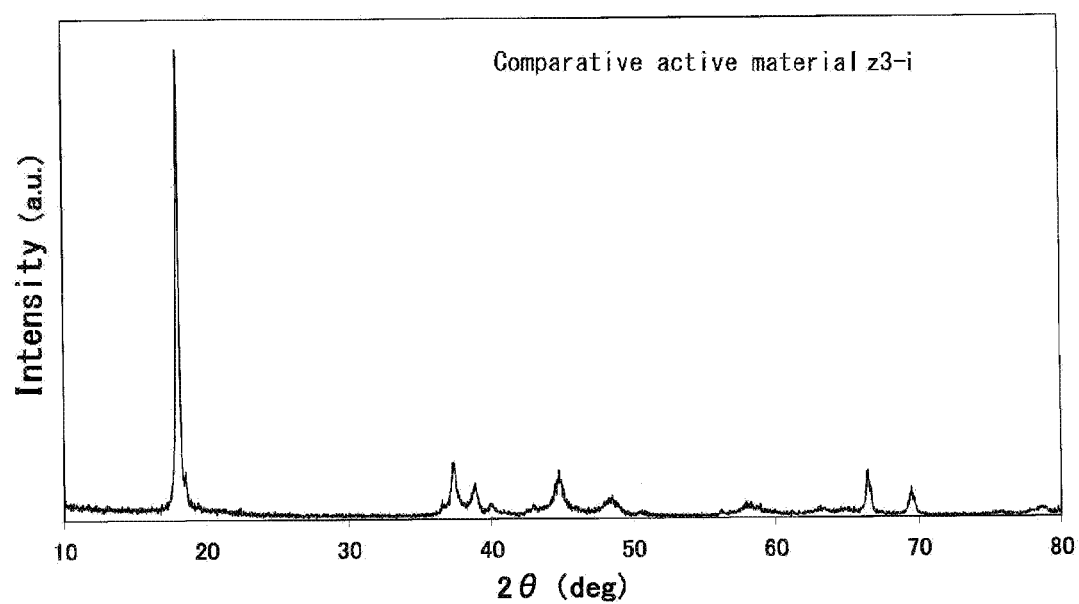
FIG. 16 is a graph showing the result of an XRD analysis for a comparative active material z3-i.

In addition, as clearly seen from FIGS. 10 to 12, an additional peak is observed at 2θ=18.4° for the present invention active materials a1-i to a3-i, in which magnesium is added, and it is observed that the peak intensity of this peak is greater when the amount of magnesium added is greater.

This peak is believed to originate from the lattice defects in the crystal structure.

On the other hand, it is observed that the peak at 2θ=37.4° observed for the comparative reference active material x-i shifts toward a low-angle side when the amount of magnesium added is greater.

From the foregoing, it is understood that the present invention active materials a1-i to a3-i, in which magnesium is added, has a different structure from that of the comparative reference active material x-i, and moreover, the structural change is greater when the amount of magnesium added is greater.

On the other hand, the XRD profiles of the comparative active materials z1-i to z3-i, in which potassium is added, are similar to that of the comparative reference active material x-i, so they are believed to have the same structure.

From the foregoing results of the experiment, it is clear that the crystal structure does not change when adding potassium alone to the reference active material, but the crystal structure changes when adding magnesium to the reference active material. Thus, it is demonstrated that when adding a metal to the reference active material, the effect on the crystal structure varies depending on the type of the metal added.

Next, the relationship between the differences in the crystal structure and battery performance was investigated. The results will be described in the following experiment 4.

Experiment 4

Each of the present invention cells A1 to A3, the comparative reference cell X, and the comparative cells Z1 to Z3 was charged and discharged one time under the following conditions to determine the average discharge potential. The results are shown in Table 3 below.

Charge Conditions

The cells were charged at a charge current of 0.06 mA/cm$^2$ (equivalent to 0.05 It) to an end-of-charge potential of 5.0 V (vs. Li/Li$^+$).

Discharge Conditions

The cells were discharged at a discharge current of 0.06 mA/cm$^2$ (equivalent to about 0.05 It) to an end-of-discharge potential of 2.0 V (vs. Li/Li$^+$).

TABLE 3

| Cell | Composition ratio | Average discharge potential [V (vs. Li/Li$^+$)] |
|---|---|---|
| Present invention cell A1 | $Li_{0.7}Mg_{0.05}Mn_{0.5}Co_{0.5}O_2$ | 3.68 |
| Present invention cell A2 | $Li_{0.7}Mg_{0.1}Mn_{0.5}Co_{0.5}O_2$ | 3.69 |
| Present invention cell A3 | $Li_{0.7}Mg_{0.2}Mn_{0.5}Co_{0.5}O_2$ | 3.70 |
| Comparative reference cell X | $Li_{0.7}Mn_{0.5}Co_{0.5}O_2$ | 3.66 |
| Comparative cell Z1 | $Li_{0.7}K_{0.1}Mn_{0.5}Co_{0.5}O_2$ | 3.58 |
| Comparative cell Z2 | $Li_{0.7}K_{0.2}Mn_{0.5}Co_{0.5}O_2$ | 3.55 |
| Comparative cell Z3 | $Li_{0.7}K_{0.3}Mn_{0.5}Co_{0.5}O_2$ | 3.52 |

As clearly seen from Table 3, the present invention cells A1 to A3, in which magnesium was added, exhibited higher average discharge potentials than the comparative reference cell X, in which the additives were not contained. In addition, among the present invention cells A1 to A3, the one containing a greater amount of magnesium showed a higher average discharge potential. In contrast, it was observed that the comparative cells Z1 to Z3, in which potassium was added, showed lower average discharge potentials than the comparative reference cell X, in which the additives were not contained. In addition, among the comparative cells Z1 to Z3, the one containing a greater amount of potassium showed a lower average discharge potential. From these results, it is demonstrated that the average potential can become either higher or lower than the sample without the additives, depending on the type of the metal to be added. This is believed to be because of the crystal structures.

As clearly seen from Table 3, the present invention cell A3, which contains a large amount of magnesium, can obtain a voltage about 0.15 V higher than that of Z2, which contains the same amount of potassium.

The present invention is applicable to, for example, driving power sources for mobile information terminal devices such as mobile telephones, notebook computers, PDAs, power tools, power assisted bicycles, EVs and HEVs.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method of manufacturing a non-aqueous electrolyte secondary battery, comprising:
    subjecting a sodium-magnesium-containing oxide represented by the general formula $Na_cMg_bMO_{2\pm\alpha}$, where $0.65 \leq c \leq 0.75$, $0 < b \leq 0.3$, $0 \leq \alpha \leq 0.3$, and M is at least one of manganese and cobalt, to ion-exchange of sodium for lithium by using a molten salt, an aqueous solution, or an organic solvent, to prepare a positive electrode active material;
    preparing a positive electrode active material slurry containing the positive electrode active material and a binder, and thereafter applying the positive electrode active material slurry to a positive electrode current collector, to prepare a positive electrode;
    interposing a separator between the positive electrode and a negative electrode to prepare a power-generating element; and
    encasing the power-generating element in a battery case, and filling an electrolyte solution in the battery case.

2. The method according to claim 1, wherein the sodium-magnesium-containing oxide is represented by the general formula $Na_cMg_bMn_xCo_yO_{2\pm\alpha}$, where $0.65 \leq c \leq 0.75$, $0 < b \leq 0.3$, $0.45 \leq x \leq 0.55$, $0.45 \leq y \leq 0.55$, $0.90 \leq x+y \leq 1.10$, and $0 \leq \alpha \leq 0.3$.

3. The method according to claim 1, wherein the positive electrode active material comprises a lithium-containing oxide active material having a crystal structure belonging to an O2 structure, a T2 structure, an O6 structure, or a mixed structure thereof.

4. The method according to claim 2, wherein the positive electrode active material comprises a lithium-containing oxide active material having a crystal structure belonging to an O2 structure, a T2 structure, an O6 structure, or a mixed structure thereof.

5. The method according to claim 1, wherein $0 < b \leq 0.2$.
6. The method according to claim 2, wherein $0 < b \leq 0.2$.
7. The method according to claim 3, wherein $0 < b \leq 0.2$.
8. The method according to claim 4, wherein $0 < b \leq 0.2$.

* * * * *